US009363158B2

(12) United States Patent
Lingafelt et al.

(10) Patent No.: US 9,363,158 B2
(45) Date of Patent: Jun. 7, 2016

(54) REDUCE SIZE OF IPV6 ROUTING TABLES BY USING A BYPASS TUNNEL

(71) Applicant: Lenovo Enterprise Solutions (Singapore) PTE. LTD., Singapore (SG)

(72) Inventors: Charles S. Lingafelt, Durham, NC (US); James W. Murray, Durham, NC (US); James T. Swantek, Canton, GA (US); James S. Worley, Raleigh, NC (US)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 186 days.

(21) Appl. No.: 14/173,187

(22) Filed: Feb. 5, 2014

(65) Prior Publication Data

US 2015/0222522 A1    Aug. 6, 2015

(51) Int. Cl.
*H04L 12/751* (2013.01)
*H04L 12/721* (2013.01)
*H04L 12/741* (2013.01)
*H04L 12/56* (2006.01)
*H04L 12/703* (2013.01)

(52) U.S. Cl.
CPC .............. *H04L 45/02* (2013.01); *H04L 45/44* (2013.01); *H04L 45/54* (2013.01); *H04L 45/28* (2013.01); *H04L 45/741* (2013.01)

(58) Field of Classification Search
CPC ....................................................... H04L 45/02
USPC ......................................................... 370/392
See application file for complete search history.

(56) References Cited

U.S. PATENT DOCUMENTS

| 7,466,674 | B2 * | 12/2008 | Okagawa et al. | ............. 370/328 |
| 7,590,048 | B2 | 9/2009 | Doukai | |
| 7,684,392 | B2 * | 3/2010 | Saito et al. | ................... 370/389 |

(Continued)

FOREIGN PATENT DOCUMENTS

EP    2 181 531 B1    1/2014

OTHER PUBLICATIONS

Internet Society et al., "Basic Transition Mechanisms for IPv6 Hosts and Routers", An IP.com Prior Art Database Technical Disclosure; http://ip.com/IPCOM/000130117D; Oct. 1, 2005.

(Continued)

*Primary Examiner* — Dang Ton
*Assistant Examiner* — Nourali Mansoury
(74) *Attorney, Agent, or Firm* — Olive Law Group, PLLC

(57) ABSTRACT

There are provided a system, a method and a computer program product for routing a data packet. A first router includes a routing table having address routes for routing packets of a first network communication protocol and address routes for routing packets of a second network communication protocol. A source router, adjacent to the first router, stores first network communication protocol addresses of routers adjacent to the first router. The system creates a network communication path from the source router to one or more adjacent routers for only routing the data packets according to a corresponding first network communication protocol address route. The system updates the routing table of the first router to remove the second network communication protocol address routes to the adjacent routers. The system routes the data packet according to the created network communication path and the updated routing table of the first router.

25 Claims, 8 Drawing Sheets

(56) References Cited

U.S. PATENT DOCUMENTS

| | | |
|---|---|---|
| 8,339,942 B2 | 12/2012 | Liu et al. |
| 8,432,913 B2* | 4/2013 | Suzuki et al. ............... 370/392 |
| 2004/0162909 A1 | 8/2004 | Choe et al. |
| 2007/0153795 A1* | 7/2007 | Devereux et al. ............ 370/392 |
| 2009/0080326 A1 | 3/2009 | Xu |
| 2009/0296571 A1* | 12/2009 | McCourt ...................... 370/225 |
| 2011/0044336 A1* | 2/2011 | Umeshima .................. 370/390 |
| 2012/0075988 A1* | 3/2012 | Lu et al. ....................... 370/218 |
| 2013/0051217 A1 | 2/2013 | So et al. |

OTHER PUBLICATIONS

Internet Society et al., "Using IPsec to Secure 1Pv6-in-IPv4 Tunnels", An IP.com Prior Art Database Technical Disclosure; http://ip.com/IPCOM/000152787D; May 1, 2007.

\* cited by examiner

REDUCE SIZE OF IPV6 ROUTING TABLES BY USING A BYPASS TUNNEL

BACKGROUND

This disclosure relates generally to routing of data packets, and particularly to creating of a network communication path that routes data packets only according to IPv4 address route rather than IPv6 address route.

BACKGROUND OF THE INVENTION

As IPv6 is deployed as an additional addressing scheme for networks, it is often deployed in parallel to an existing IPv4 addressing that is currently in use. As a result, network devices, e.g., routers or switches, etc., are assigned two addresses, e.g., IPv4 network address and IPv6 network address. Routers are burdened by the need to maintain routing tables for both sets of addresses, and routing table entries for IPv6 is larger because IPv6 network addresses are four times larger than IPv4 network addresses. These larger IPv6 network addresses result in the exhaustion of an available memory for routing tables, impacting the performance of the network and potentially resulting in the loss of data in the network.

Many communication network enterprises are currently applying IPv6 network protocol to their existing IPv4 networks, in order to use both network protocols in parallel. The integration of IPv6 network protocol in existing IPv4 networks is adding additional burden on existing routers, which often includes a full routing table for an enterprise.

SUMMARY

There are provided a system, a method and a computer program product for routing a data packet in a communication network which operates according to network communication protocols. The system routes the data packet to a target destination via a first router implementing a routing table having address routes for routing packets of a first network communication protocol and address routes for routing packets of a second network communication protocol. The system stores, in a source router adjacent to the first router, first network communication protocol addresses of routers adjacent to the first router. The system creates a network communication path from the source router to one or more adjacent routers for only routing the data packets according to a corresponding first network communication protocol address route. The system detects whether the address routes of the first router for routing packets of the second network communication protocol includes routes to any adjacent router. The system updates the routing table of the first router to remove the second network communication protocol address routes to the adjacent routers. The system routes the data packet according to the created network communication path and the updated routing table of the first router.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 1 illustrates an example network configuration in one embodiment;

FIG. 2 illustrates an example network configuration that creates a network communication path in one embodiment;

FIG. 3 illustrates a flowchart that describes method steps performed by the congested router in one embodiment;

FIG. 4 illustrates a flowchart that describes method steps for creating a network communication path in one embodiment;

FIG. 5 illustrates a flowchart for performed by a bypass target router in one embodiment;

FIG. 6 illustrates an example network configuration performed after the creation the created network communication path in one embodiment;

FIG. 7 illustrates example computing systems in one embodiment; and

FIG. 8 illustrates a flowchart that describes method steps for routing a data packet in one embodiment.

DETAILED DESCRIPTION

This disclosure solves the problem of router memory exhaustion in routers operating according to both IPv4 and IPv6 network communication protocol, e.g., by dynamically reducing the requirement for storing IPv6 address routes on intermediate routers. This is accomplished by creating a network communication path(s) to other routers that are able to maintain these address routes (e.g., IPv4 and IPv6 network communication paths) within their routing table. In a routing table of a congested router whose a capacity of routing table is larger than a threshold, IPv6 address routes are removed but corresponding IPv4 address routes are not removed. This removal of the IPv6 address routes in the routing table of the congested allows those congested router to continue to function in an IPv4 and IPv6 environment without requiring an upgrade to the congested router. This removal of the IPv6 address routes in the routing table of the congested router differs from current methods of route summarization that are not dynamic and that do not leverage the capabilities enabled by having both the IPv4 address routes and IPv6 address routes.

FIG. 1 illustrates an example network configuration 100 of routers. There are provided at least five different networks 105, 110, 150, 155 and 160. There are provided at least seven different routers 115, 120, 125, 130, 135, 140 and 145. In the example network configuration 100, a router is connected to at least one network. Routers C 125 and D 130 are backbone routers which interconnect other routers, for example, routers that enable Internet communication worldwide. Routers A-G (115-145) are switches or network devices.

In one embodiment, a routing table of the router G 145 has an IPv6 address route to an IPv6 network G 150 that the router G 145 shares across other routers A 115, B 120, D 130 and E 135 except router F 140. When the router C 125 requests the router G 145 to set up a bypass for this IPv6 address route, the router G 145 requests the other routers (A 115, B 120, D 130 and E 135) to first set up a IPv4 tunnel (if not already in place) with G 145. The IPv4 tunnel includes, but is not limited to: encapsulating a data packet formatted using IPv6 network protocol within another data packet formatted using IPv4 network protocol; and transferring the another data packet via a connected network communication path operated according to IPv4 network protocol. The router G 145 shares the IPv6 address route directly with the routers A115, B120, D130 and E 135 over the IPv4 tunnel: IPv6 data packets to be transferred between the routers A 115, B 120, D 130, E 135 and G 145 are encapsulated within one or more IPv4 data packets; and then the one or more IPv4 data packets are transferred to corresponding destination(s) via the connected network communication path. Once the IPv4 tunnel is set up, the router G 145 requests the router C 125 to remove the IPv6 address route from the routing table(s) of the router C 125 (i.e., remove the IPv6 address route from a memory or storage device of the router C 125).

Figure 2:
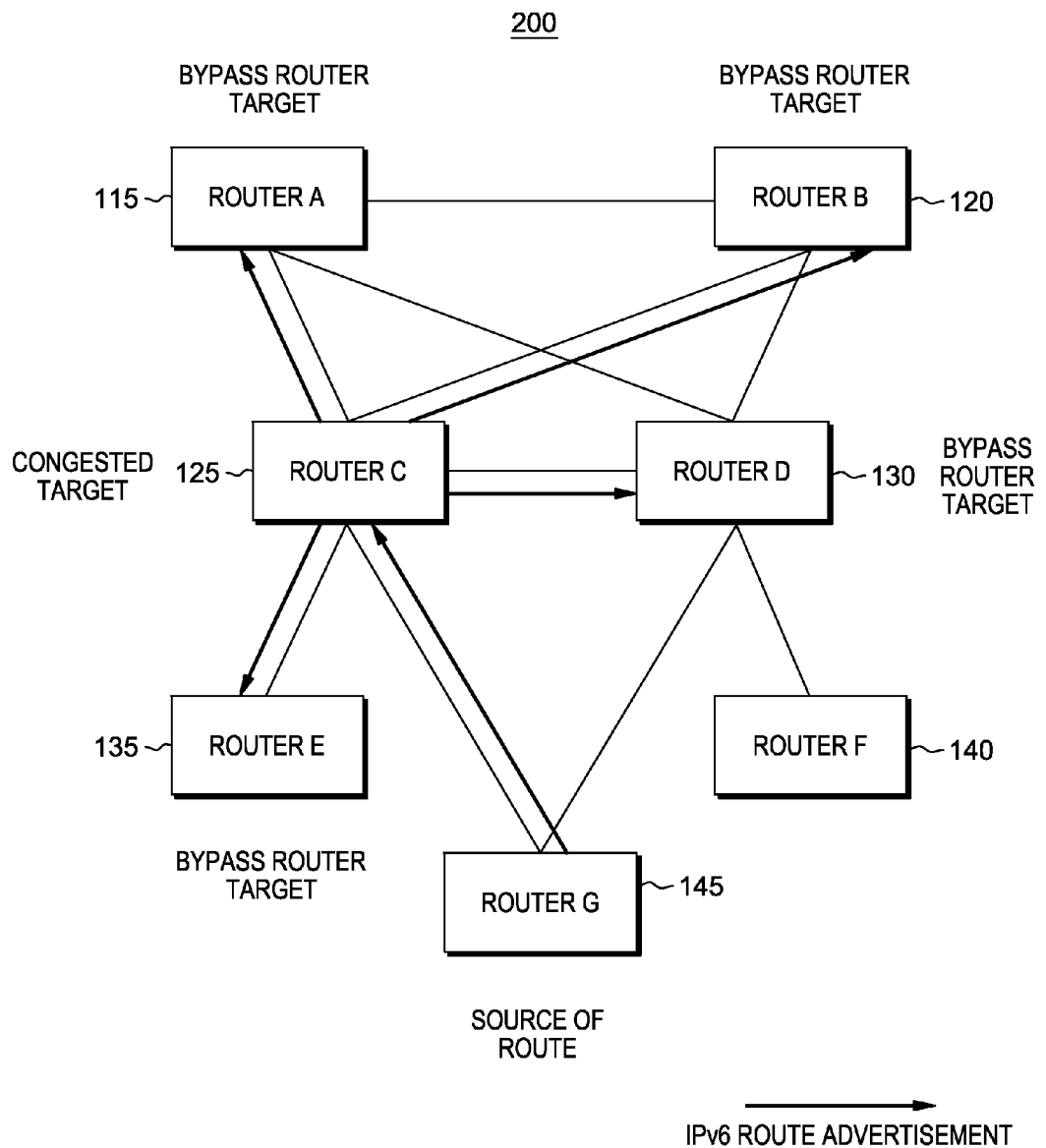
Figure 8:
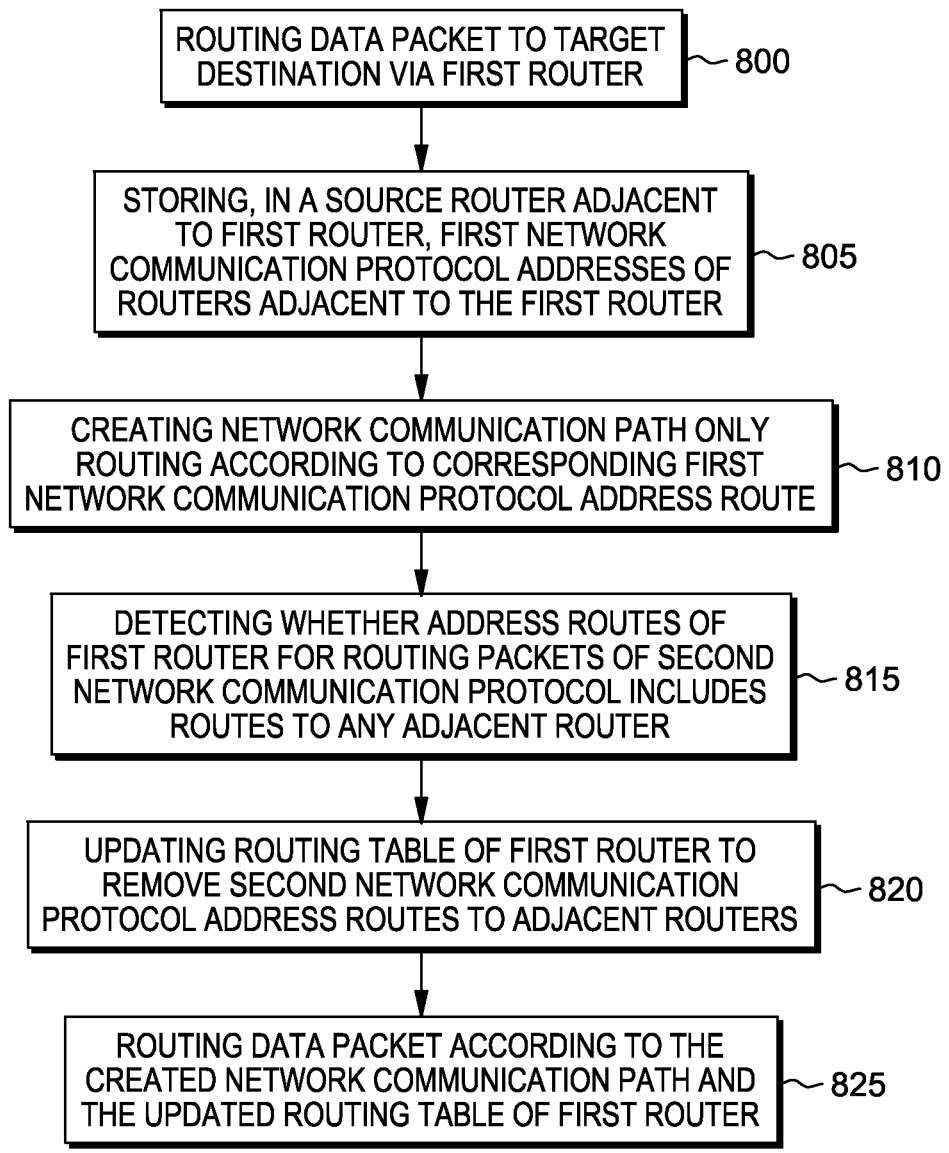

FIG. 8 illustrates a flowchart that describes method steps for routing data packet in a communication network and preventing memory exhaustion of a congested router caused by a increasing routing table size of the congested router in one embodiment. FIG. 2 illustrates an example network configuration 200 through which a data packet is routed. Returning to FIG. 8, a computing system routes a data packet to a target destination via a first router (e.g., a congested router 125, etc.). The first router implements a routing table having address routes for routing packets of a first network communication protocol (e.g., IPv4, etc.) and address routes for routing packets of a second network communication protocol (e.g., IPv6, etc.). Examples of the computing system include, but is not limited to: a workstation, a parallel computing system, a laptop, a desktop, etc. At 805, a source router (e.g., source router 145, etc.) adjacent to the first router stores first network communication protocol addresses of routers adjacent to the first router.

At 810, the source router creates a network communication path from the source router to one or more routers adjacent, e.g., routers A-B 115-120 and routers E-G 135-145, etc., to the first router. In one embodiment, the creation of the network communication path includes, but is not limited to: encapsulating a data packet using the second network communication protocol within another data packet formatted using the first network communication protocol. In order to create the network communication path, the source router checks whether there exists, at the source router, a first network communication protocol address route corresponding to each second network communication protocol address route.

The source router routes the data packets only according to a first network communication protocol address route. The source router directs the data packet from the first router to one of the adjacent routers via the first network communication protocol address route. At 815, the source router detects whether the address routes of the first router for routing packets of the second network communication protocol include routes to any router adjacent to the first router. At 820, the source router updates the routing table of the first router to remove the second network communication protocol address routes to the adjacent routers. The removed second network communication protocol address routes, which are stored in the routing table of the first router, are one or more of: (1) least recently used second network communication protocol address routes; (2) address routes between the adjacent routers which have sent both second network communication protocol address routes and first network communication protocol address routes to the first router; and (3) one or more address routes that have been received from an adjacent router via a routing protocol. At 825, the first router routes the data packet according to the created network communication path and the updated routing table of the first router. The source router may directly communicate with the routers adjacent to the first router. In one embodiment, the first network protocol is IPv4, and the second network protocol is IPv6.

In one embodiment, the first router compares a memory utilization of the first router against a threshold. The first router uses the created network communication path if the memory utilization is larger than the threshold. In one embodiment, the first router deactivates the created network communication path if the memory utilization of the first router is lower than the threshold. The first router deactivates the created network communication path after a pre-determined time period passes from using of the created network communication path.

In a further embodiment, the first router receives an acknowledgement of the creation of the network communication path from the source router. Upon receiving the acknowledgement of the creation of the network communication path, the first router acknowledges the removal of the second network communication protocol address routes in its routing table.

Upon failing to receive the acknowledgement of the creation of the network communication path for a pre-determine time period, the first router determines that the source router cannot create the network communication path. The first router selects, upon the failure to receive the acknowledgement of the creation of the network communication path for the pre-determine time period, a different adjacent router in order to bypass one or more second network communication protocol address routes stored in the first router.

FIG. 2 illustrates an example network configuration 200 which includes the congested router C 125 and bypass target routers A-B, D and E 115-120, 130 and 145. As a routing table of the congested router C 125 becomes full, the congested router C 125 removes an IPv6 address route(s) that has to be dropped from its routing table. The congested router C 125 communicates with adjacent routers (also called bypass target routers) A-B (115-120) and D-E (130-135) only via an IPv4 address routes, i.e., the created communication network path (also called bypass tunneling). The router G 145 sets up the bypass tunneling which transfers a data packet using IPv4 network address protocol rather than IPv6 network address protocol after removing the IPv6 address routes in the routing table of the congested router C 125. The source router G 145 may notify other routers of which router can communicate directly each other, e.g., by sending an electronic notification that requests the other routers to create a direct communication link.

When the routing table size of the congested router C 125 reaches a threshold set previously, the congested router C 125 selects an IPv6 address route received from an adjacent router(s) that can be deleted to lower memory utilization of the congested router C 125. The IPv6 address routes to be deleted are selected based on factors known to the congested router C 125. Those factors include, but are not limited to: (1) least recently used IPv6 address route stored in a routing table of the congested router C 125; (2) address routes between adjacent routers which have advertised both IPv6 and IPv4 address routes to the congested router C 125; (3) address routes that have been received from an adjacent router via a dynamic routing protocol (e.g. OSPF, BGP); (4) the most expensive network communication routes, e.g., there exist the largest number of hops between the congested router and a target router; and (5) priority of network communication routes, e.g., QoS settings.

In one embodiment, the congested router C 125 initiates a request to an adjacent router that is a source of an IPv6 route (i.e., source router G 145) to create bypass tunnels. The request to the source router G 145 includes the IPv4 address of each of the routers adjacent to the congested router C 125 that receives IPv6 address routes from bypass target routers (also called routers adjacent to the first router) A-B (115-120) and D-E (130-135). The congested router C 125 waits for an acknowledgement of the creation of the bypass tunnels from the source router G 145, confirms the removal of IPv6 address routes from the routing table of the congested router C 145, then repeats the removal of the IPv6 address routes from the routing table of the congested router until memory utilization of the congested router C 125 becomes below the threshold. Should the source router G 145 fails to acknowledge the creation of the bypass tunnels, the source router G 145 is marked as temporarily unable to participate in the creation of the bypass tunneling. A different adjacent router is selected for the creation of the bypass tunneling.

Figure 3:
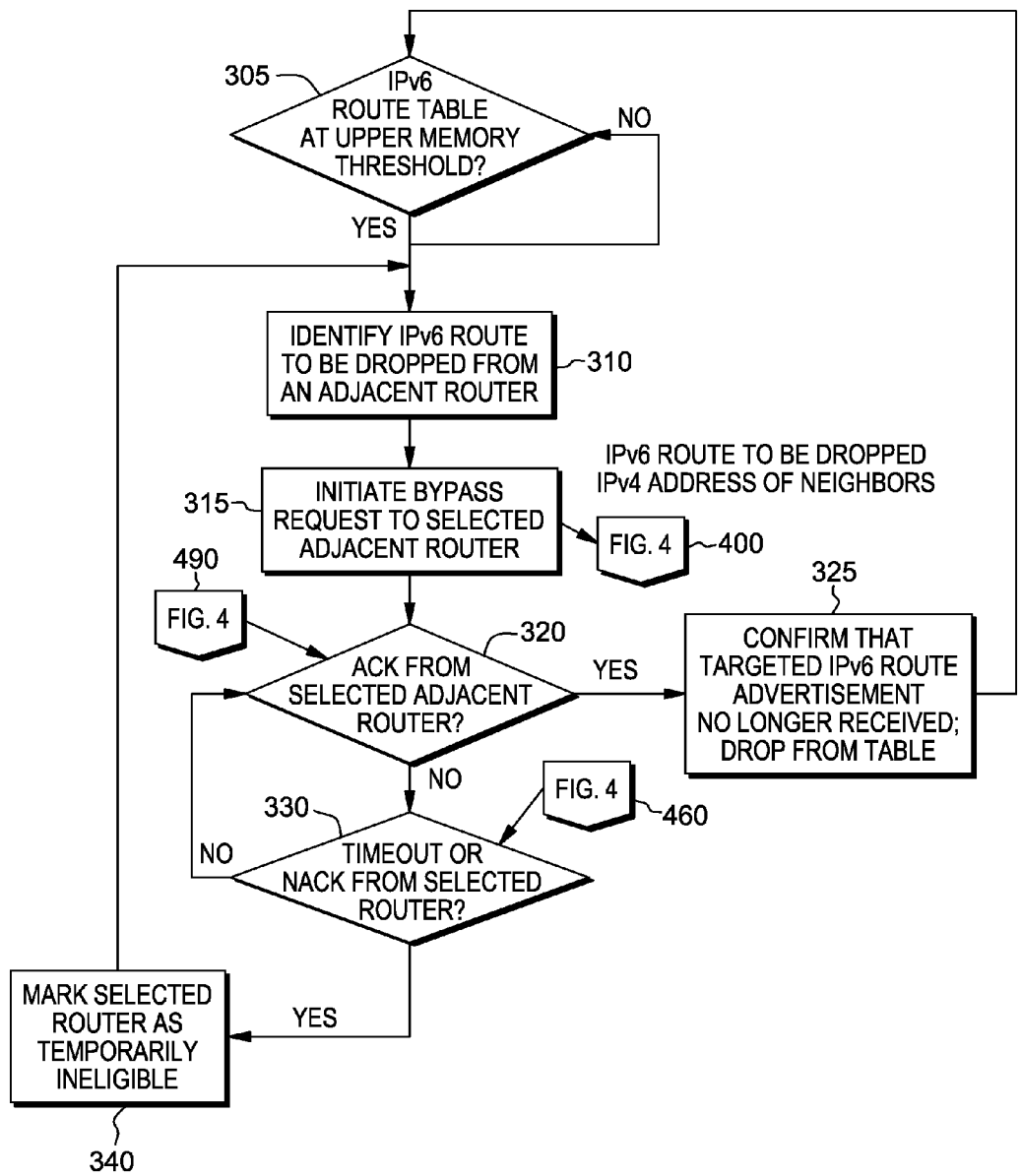

FIG. 3 illustrates method steps run by the congested router C 125. Upon exceeding the threshold, the congested router C 125 deletes IPv6 address routes in the routing table. The congested router C 125 processes only IPv4 network addresses, not IPv6 network addresses.

At 305, the congested router C 125 evaluates whether its memory utilization is more than a threshold, e.g., due to a full capacity of the corresponding routing table. If the memory utilization is more than the threshold, the congested router C 125 sends a request to create the bypass tunneling to the source router G 145. At 310-315, when a request from the congested router C 125 is received, the source router G 145 evaluates if there exists the bypass tunnelling in place for each bypass target router. If there exists no bypass tunneling, a new bypass tunnel creation is attempted. The congested router C 125 identifies IPv6 route addresses to be dropped in its routing table. Then, the congested router C 125 initiates step 400 in FIG. 4 at which the source router G 145 creates the bypass tunneling. At 320, after the creation of the bypass tunneling is successfully completed for each of bypass target routers, the congested router C 125 evaluates when the source router G 145 has sent a positive acknowledgement to the congested router C 125. At 325, the congested router C 125 receives the positive acknowledge of the creation of the bypass tunneling. At 330, if the source router G 145 fails to set up the bypass tunneling, the source router G 145 notifies the congested router C 125 that the creation of the bypass tunneling cannot be accomplished. And, the source router G 145 sends a negative acknowledgement back to the congested router C 125. The source router G 145 performs step 460 in FIG. 4. Upon receiving the negative acknowledgement from the source router G 145, the congested router C 125 marks the source router G 145 as temporarily ineligible to create the bypass tunneling.

Figure 4:
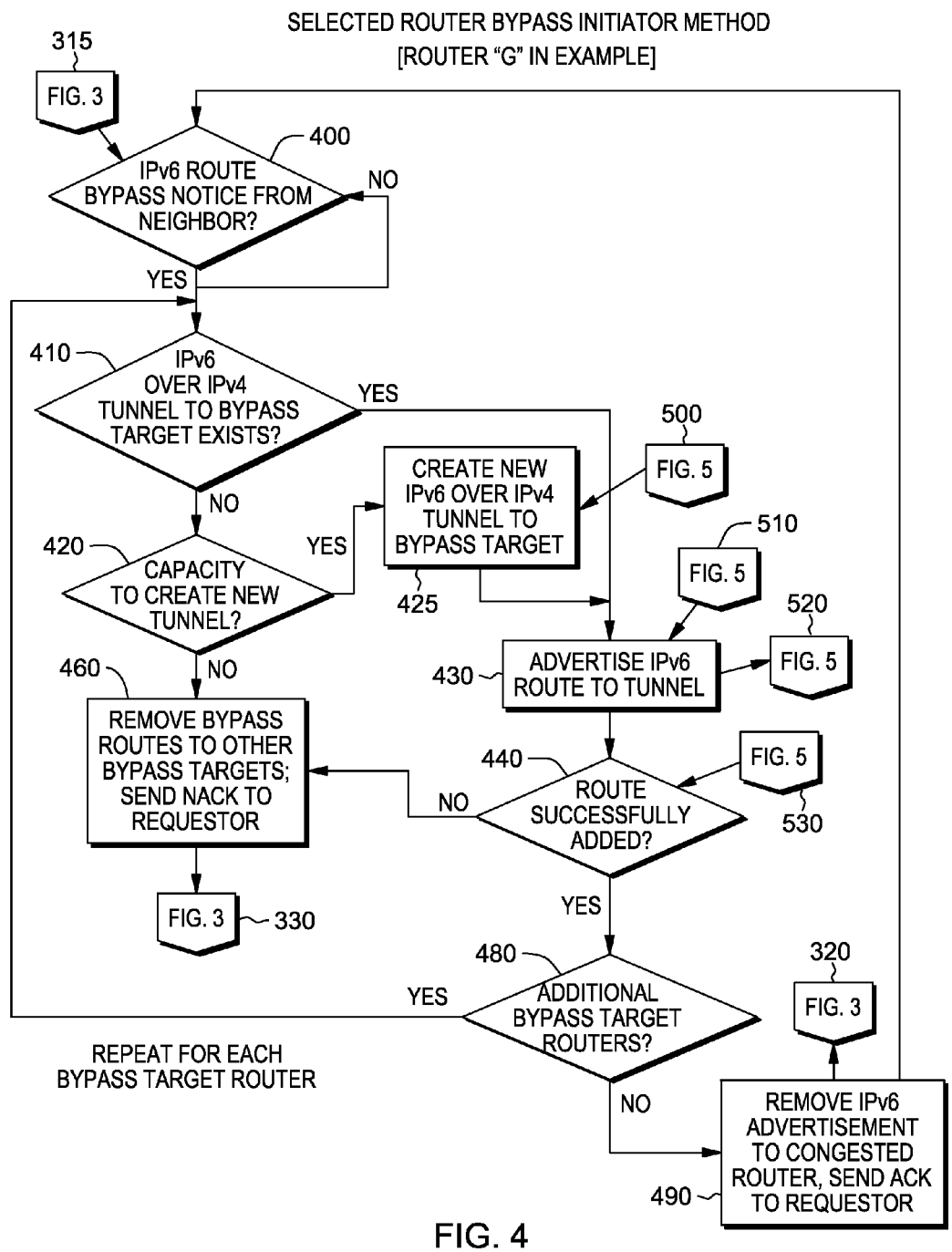

FIG. 4 illustrates a flowchart describing method steps for creating a bypass tunneling in one embodiment. The source router G 145 communicates with the adjacent routers of the congested router C 125. The adjacent router G 145 uses only IPv4 route addresses. After performing step 315 in FIG. 2, at 400, the source router G 145 evaluates whether the source router G 145 receives an electronic notice, e.g., by text, email, etc., for the creation of the bypass tunneling from the congested router C 125. At 410, the source router G 145 evaluates whether the bypass tunneling exists. At 420, if there exists no bypass tunneling, the source router G 145 evaluates whether there exists a capacity to create a bypass tunneling. At 425, if there exists the capacity to create the bypass tunneling, the source router G 145 creates the bypass tunneling from the congested router C 125 to router adjacent to the source router G 145. Then, the source router G performs step 500 in FIG. 5 in which the creation of the bypass tunneling is initiated. The source router G 145 adds the created bypass tunneling to the network 200. The source router G 145 initiates the creation of the bypass tunneling and creates the bypass tunneling, e.g., by routing data packets via IPv4 network addresses rather than IPv6 network addresses. At 430, the source router G 145 notifies the bypass tunneling is created. Then, the source router G 145 performs step 520 in FIG. 5 at which the congested router receives the notification of the creation of the bypass tunneling. The source router G 145 performs step 530 in FIG. 5 at which the source router G 145 adds the created bypass tunneling to the network 200, e.g., by routing of data packets via IPv4 network addresses, not IPv6 network addresses. At 440, the source router G 145 evaluates whether the bypass tunneling is successfully created. At 460, if the source router G 145 notifies that the bypass tunneling is not successfully created, the source router G 145 removes the request for the creation of the bypass tunneling. The source router G 145 sends a negative acknowledgement to the congested router C 125. Then, the source router G 145 performs step 330 in FIG. 3. At 480, if the bypass tunneling is successfully added, the congested router C 125 evaluates whether there exists an additional bypass target routers. The congested router C 125 repeats the method steps in FIG. 4 for each bypass target router. At 490, if there exists no additional bypass target router, the source router G 145 sends the acknowledgement of the removal of the notification to the congested router C 125.

Figure 5:
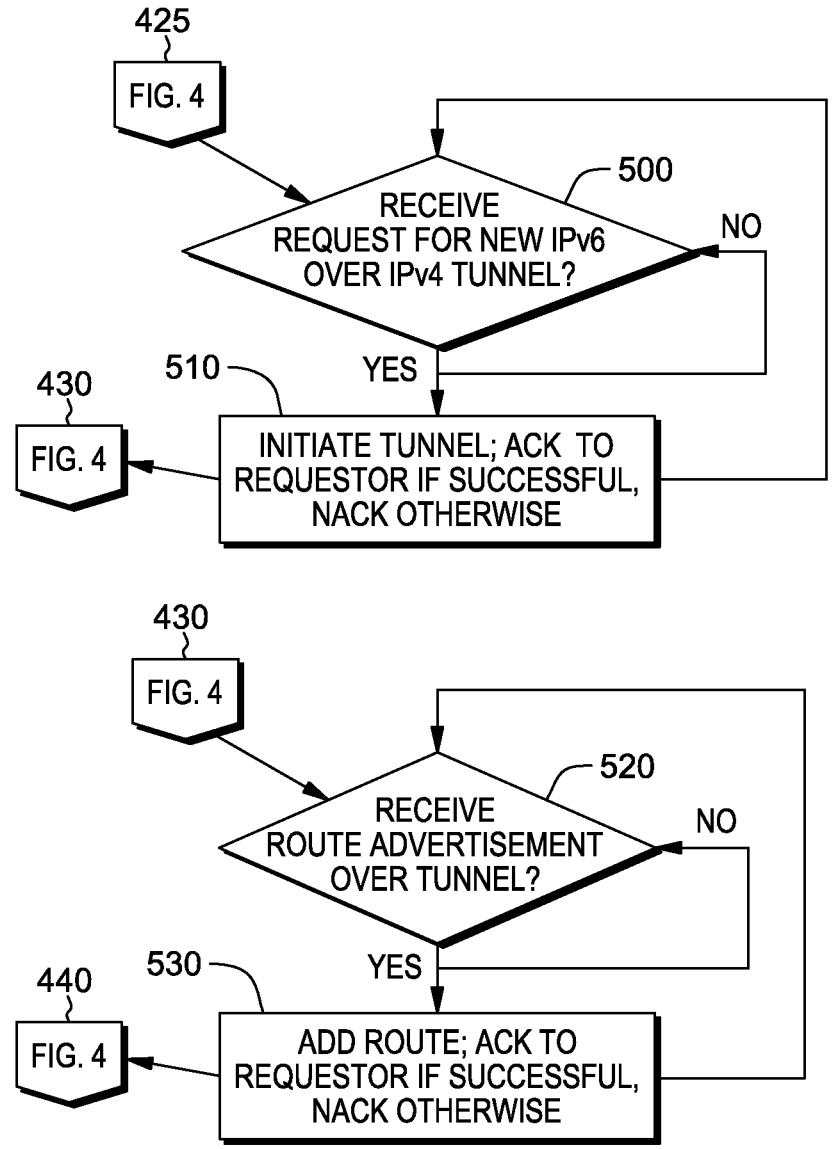

FIG. 5 illustrates a flowchart that describes method steps performed by a bypass target router, e.g., a bypass target router B 120 in FIG. 2. At 425 in FIG. 4, the source router G 145 creates the bypass tunneling. At 500 in FIG. 5, the bypass target router B 120 evaluates whether the bypass target router B 120 receives a request for creating a bypass tunneling, i.e., a network communication path that routes data packet(s) according to IPv4 network communication protocol by deleting IPv6 network addresses in the routing table of the congested router C 125. At 510, if the bypass target router B 120 receives the request for creating the bypass tunneling, the bypass target router B 120 initiates the creation of the bypass tunneling. Then, the source router performs step 430 in FIG. 4 at which the source router G 145 advertises the IPv6 route to the bypass target router B 120. At 520, the bypass target router B 120 evaluates whether the bypass target router B 120 received the notification of an IPv6 address route from the source router G 145. If the bypass target router B 120 receives the notification, at 530, the bypass target router B 120 adds the IPv6 address route to the network 200. If the IPv6 address route is successfully added to the network 200, at 530, the bypass target router B 120 sends an acknowledgement of the addition of the IPv6 address route to the source router G 145. If the IPv6 address route is not successfully added to the network 200, at 530, the bypass target router B 120 sends a negative acknowledgement to the source router G 145. Then, at 440-480 in FIG. 4, the source router G 145 evaluates whether there exists an additional bypass target router that receives the IPv6 address route from the source router G 145.

Figure 1:
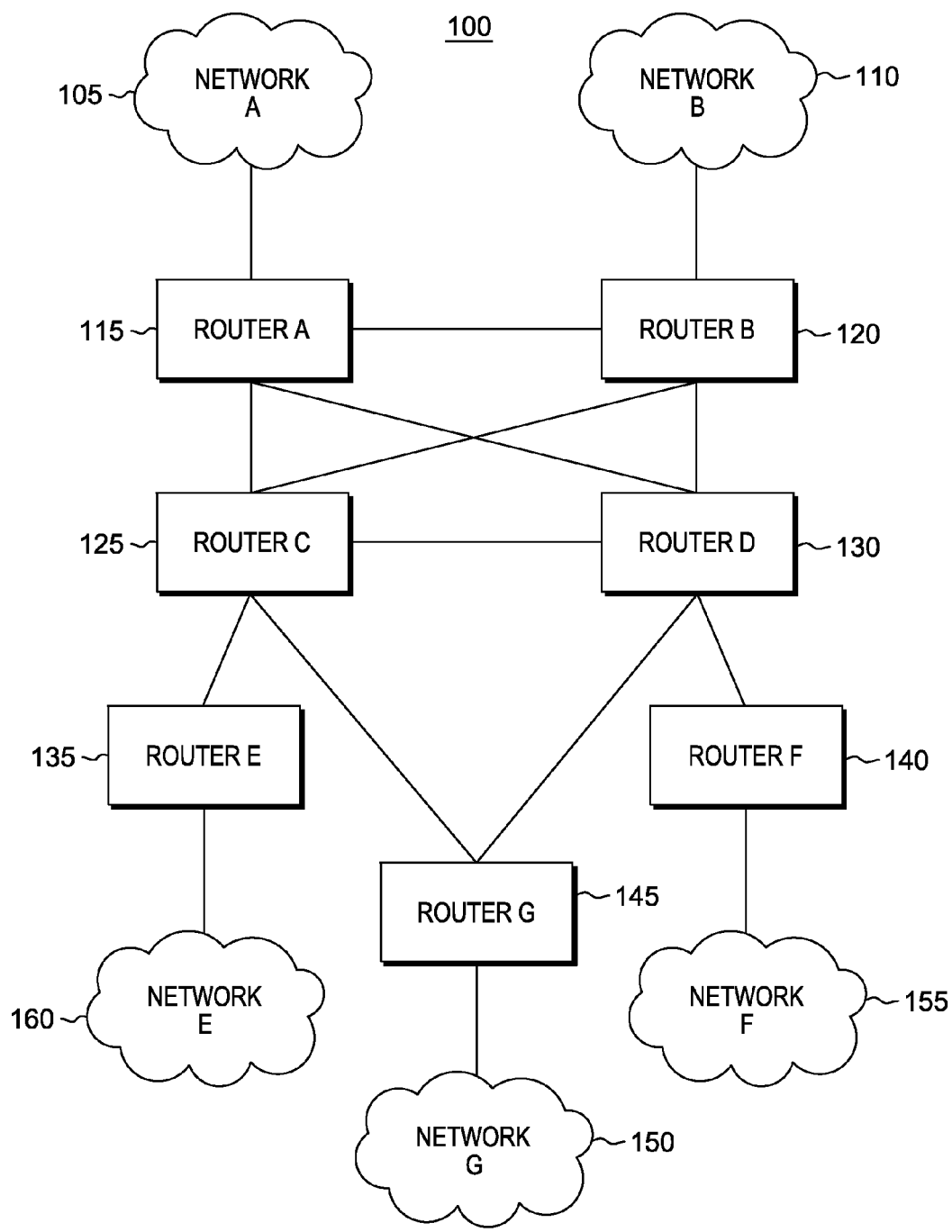
Figure 6:
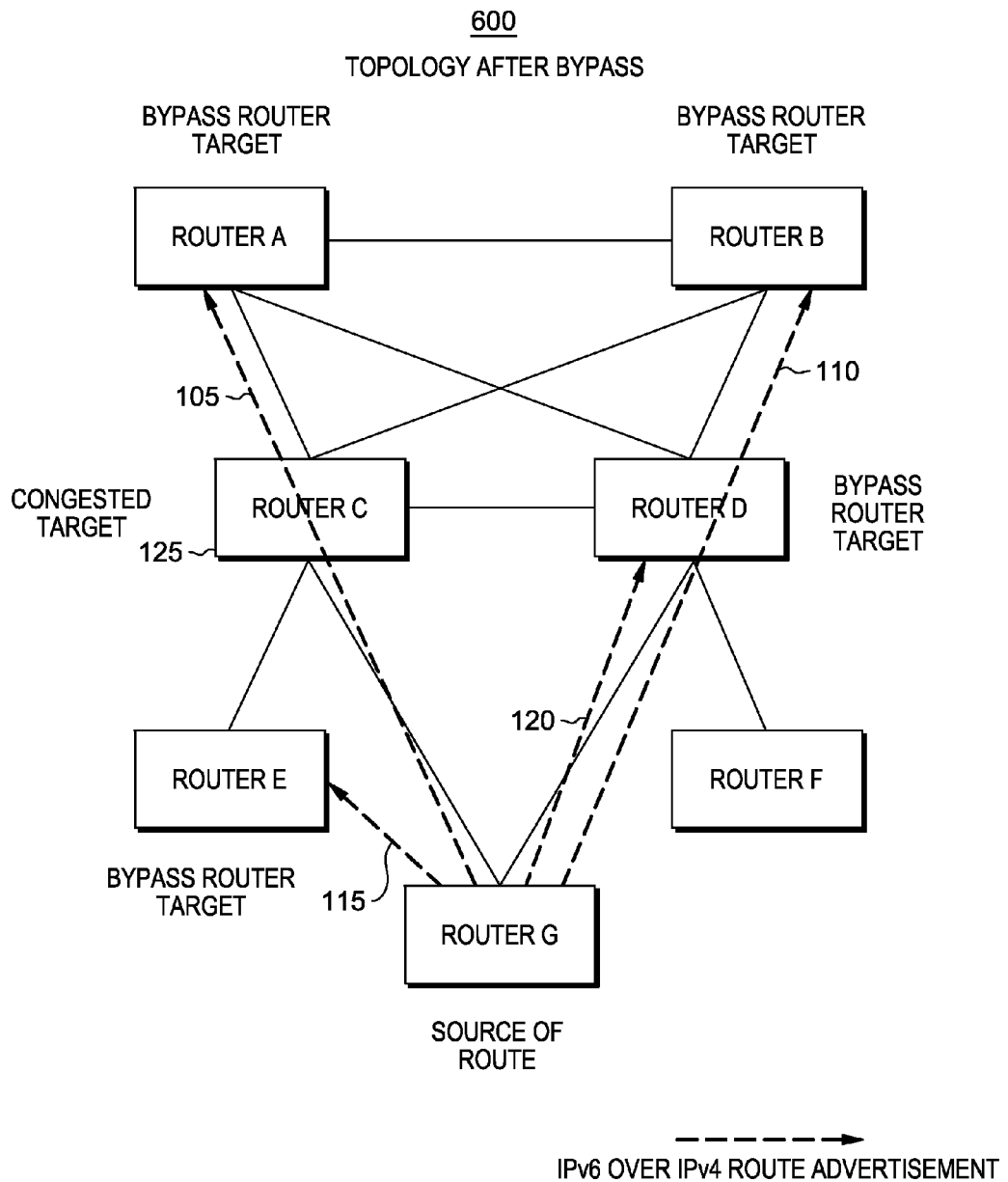
Figure 7:
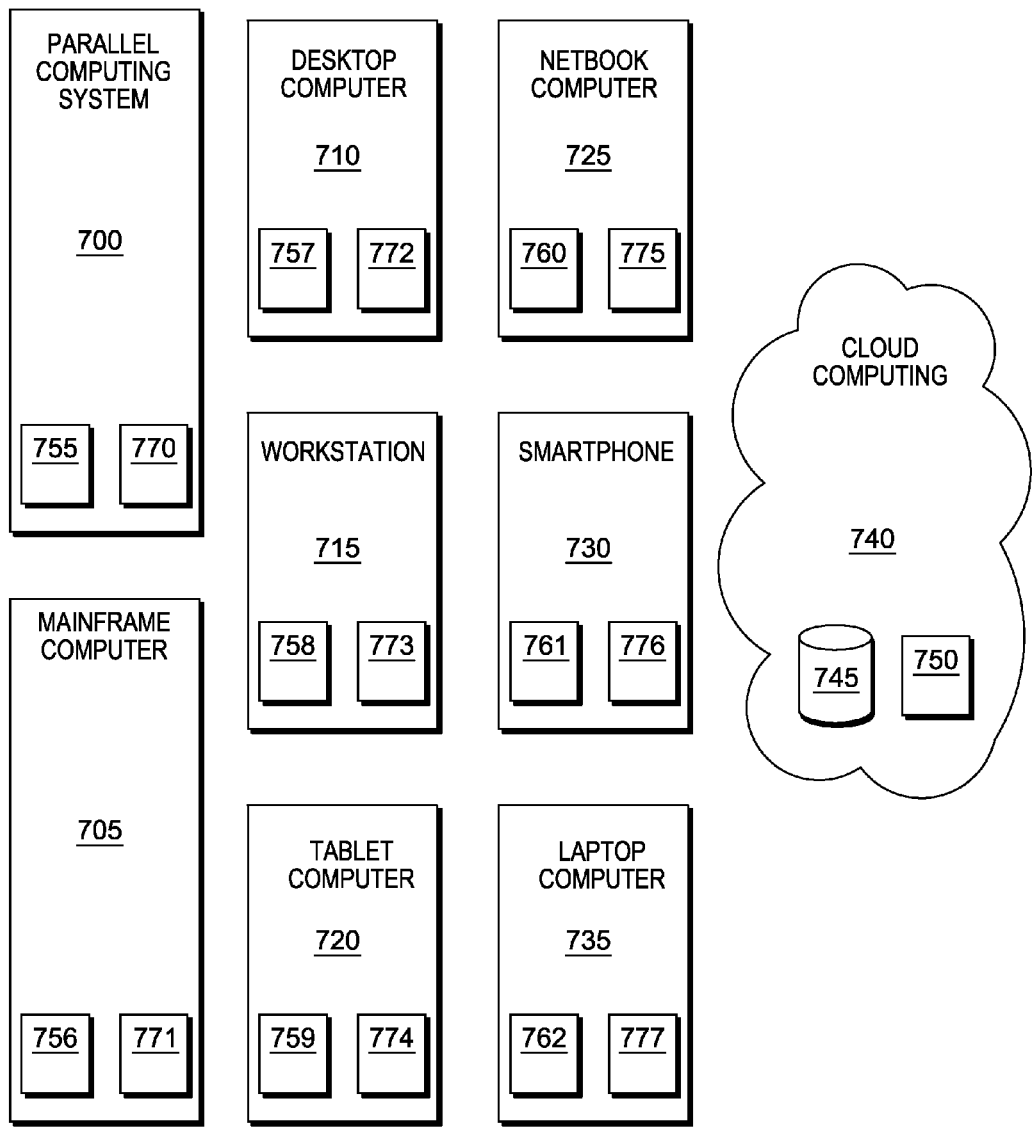

FIG. 6 illustrates an example network configuration 600. After the source router G 145 creates the bypass tunneling(s), there exist four different bypass tunneling(s) 105-120. The congested router C 125 does not recognize IPv6 data packets but recognizes IPv4 data packets. The creation of the bypass tunneling does not cause a memory capacity issue in a backbone router, e.g., router C 125 in FIG. 1. The bypass tunneling reduces a memory requirement for the congested router C 125. For example, after the bypass tunneling is in place, the congested router C 125 can drop one or more IPv6 address routes from the routing table(s) of the congested router C 125. Since all the IPv4 address routes may be already in the congested router's memory (or routing table), the congested router C 125 may be unaware of the bypass tunneling. The congested router C 125 processes and transfers only IPv4 data packets, which can encapsulate IPv6 data packet(s), along IPv4 address routes connected to the congested router C 125.

In one embodiment, the methods shown in FIGS. 3-5 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 1 may be implemented on a semiconductor chip, e.g., ASIC (Application-Specific Integrated Circuit), by using a semi custom design methodology, i.e., designing a semiconductor chip using standard cells and a hardware description language.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for routing a data packet in a communication network which operates according to network communication protocols, the method comprising:
routing the data packet to a target destination via a first router implementing a routing table having address routes for routing packets of a first network communication protocol and address routes for routing packets of a second network communication protocol;
storing, in a source router adjacent to the first router, first network communication protocol addresses of routers adjacent to the first router;
creating a network communication path, from the source router to one or more adjacent routers for only routing the data packet according to a corresponding first network communication protocol address route;

detecting whether the address routes of the first router for the routing packets of the second network communication protocol includes routes to any adjacent router;

updating the routing table of the first router to remove the second network communication protocol address routes to the adjacent routers; and routing the data packet according to the created network communication path and the updated routing table of the first router.

2. The method according to claim 1, further comprising comparing a memory utilization of the first router against a threshold; and using the created network communication path if the memory utilization is larger than the threshold.

3. The method according to claim 2, further comprising:

deactivating the created network communication path if the memory utilization is lower than the threshold; or deactivating the created network communication path after a pre-determined time period passes from the using of the created network communication path.

4. The method according to claim 1, wherein the creating further comprises:

checking whether there exists, at the source router, a first network communication protocol address route corresponding to each second network communication protocol address route, the source router directing the data packet from the first router to one of the adjacent routers via the first network communication protocol address route.

5. The method according to claim 4, wherein the removed second network communication protocol address routes are one or more of: least recently used second network communication protocol address routes, address routes between the adjacent routers which have sent both second network communication protocol address routes and first network communication protocol address routes to the first router, one or more address routes that have been received from an adjacent router via a routing protocol.

6. The method according to claim 4, wherein the removing further comprises:

receiving an acknowledgement of the creating from the source router;

upon receiving the acknowledgement, acknowledging, at the first router, the removal of the second network communication protocol address routes.

7. The method according to claim 6, further comprising:

upon failing to receive the acknowledgement, indicating that the source router cannot create the network communication path; and selecting, upon the failure to receive the acknowledgement, a different adjacent router in order to bypass one or more different second network communication protocol address routes.

8. The method according to claim 1, wherein the source router directly communicates with the adjacent routers.

9. The method according to claim 1, wherein the first network protocol is IPv4, and the second network protocol is IPv6.

10. A system for routing a data packet in a communication network which operates according to network communication protocols, the system comprising:

a first router routing the data packet to a target destination, the first router implementing a routing table having address routes for routing packets of a first network communication protocol and address routes for routing packets of a second network communication protocol;

a source router adjacent to the first router storing a first network communication protocol addresses of routers adjacent to the first router;

the source router creating a network communication path from the source router to one or more adjacent routers for only routing the data packet according to a corresponding first network communication protocol address route;

the first router detecting whether the address routes of the first router for the routing packets of the second network communication protocol includes routes to any adjacent router;

the first router updating the routing table of the first router to remove the second network communication protocol address routes to the adjacent routers; and the first router routing the data packet according to the created network communication path and the updated routing table of the first router.

11. The system according to claim 10, wherein the first router comparing a memory utilization of the first router against a threshold; and the first router using the created network communication path if the memory utilization is larger than the threshold.

12. The system according to claim 11, further comprising:

the first router deactivating the created network communication path if the memory utilization is lower than the threshold; or the first router deactivating the created network communication path after a pre-determined time period passes from the using of the created network communication path.

13. The system according to claim 10, wherein the creating further comprises:

the source router checking whether there exists a first network communication protocol address route corresponding to each second network communication protocol address route, the source router directing the data packet from the first router to one of the adjacent routers via the first network communication protocol address route.

14. The system according to claim 10, wherein the removed second network communication protocol address routes are one or more of: least recently used second network communication protocol address routes, address routes between the adjacent routers which have sent both second network communication protocol address routes and first network communication protocol address routes to the first router, one or more address routes that have been received from an adjacent router via a routing protocol.

15. The system according to claim 10, wherein the removing further comprises:

the first router receiving an acknowledgement of the creating from the source router;

the first router upon receiving the acknowledgement, acknowledging the removal of the second network communication protocol address routes.

16. The system according to claim 15, further comprising:

the first router upon failing to receive the acknowledgement, indicating that the source router cannot create the network communication path; and the first router selecting, upon the failure to receive the acknowledgement, a different adjacent router in order to bypass one or more different second network communication protocol address routes.

17. The system according to claim 10, wherein the source router directly communicates with the adjacent routers.

18. The system according to claim 10, wherein the first network protocol is IPv4, and the second network protocol is IPv6.

19. A computer program product for routing a data packet in a communication network which operates according to network communication protocols, the computer program product comprising a non-transitory storage medium that excludes a propagating signal, the non-transitory storage medium readable by a processing circuit and storing instructions run by the processing circuit for performing a method, said method steps comprising:

routing the data packet to a target destination via a first router implementing a routing table having address routes for routing packets of a first network communication protocol and address routes for routing packets of a second network communication protocol;

storing, in a source router adjacent to the first router, first network communication protocol addresses of routers adjacent to the first router;

creating a network communication path, from the source router to one or more adjacent routers for only routing the data packets according to a corresponding first network communication protocol address route;

detecting whether the address routes of the first router for the routing packets of the second network communication protocol includes routes to any adjacent router;

updating the routing table of the first router to remove the second network communication protocol address routes to the adjacent routers; and routing the data packet according to the created network communication path and the updated routing table of the first router.

20. The computer program product according to claim 19, wherein the method steps comprises:

comparing a memory utilization of the first router against a threshold; and using the created network communication path if the memory utilization is larger than the threshold.

21. The computer program product according to claim 20, wherein the method steps comprises:

deactivating the created network communication path if the memory utilization is lower than the threshold; or deactivating the created network communication path after a pre-determined time period passes from the using of the created network communication path.

22. The computer program product according to claim 19, wherein the creating further comprises:

checking whether there exists, at the source router, a first network communication protocol address route corresponding to each second network communication protocol address route, the source router directing the data packet from the first router to one of the adjacent routers via the first network communication protocol address route.

23. The computer program product according to claim 19, wherein the removed second network communication protocol address routes are one or more of: least recently used second network communication protocol address routes, address routes between the adjacent routers which have sent both second network communication protocol address routes and first network communication protocol address routes to the first router, one or more address routes that have been received from an adjacent router via a routing protocol.

24. The computer program according to claim 19, wherein the removing further comprises:

receiving an acknowledgement of the creating from the source router;

upon receiving the acknowledgement, acknowledging, at the first router, the removal of the second network communication protocol address routes.

25. The computer program product according to claim 19, wherein the first network protocol is IPv4, and the second network protocol is IPv6.

* * * * *